United States Patent [19]

Fukushima

[11] Patent Number: 4,846,323
[45] Date of Patent: Jul. 11, 1989

[54] FLYWHEEL ASSEMBLY

[75] Inventor: Hirotaka Fukushima, Hirakata, Japan

[73] Assignee: Kabushiki Kaisha Daikin Seisakusho, Neyagawa, Japan

[21] Appl. No.: 183,038

[22] PCT Filed: Jul. 31, 1987

[86] PCT No.: PCT/JP87/00580
§ 371 Date: Mar. 4, 1988
§ 102(e) Date: Mar. 4, 1988

[87] PCT Pub. No.: WO88/02451
PCT Pub. Date: Apr. 7, 1988

[30] Foreign Application Priority Data

Sep. 30, 1986 [JP] Japan .................. 61-233775

[51] Int. Cl.$^4$ ............................ F16F 15/30
[52] U.S. Cl. ................. 192/30 V; 192/70.17; 74/574
[58] Field of Search ........... 192/30 V, 70.17, 106.2, 192/106.1; 74/574

[56] References Cited

U.S. PATENT DOCUMENTS 4,624,351 11/1986 Lutz et al. .................. 74/574
4,638,684 1/1987 Maucher ................. 192/70.17
4,751,993 6/1988 Fukushima ................. 74/574

FOREIGN PATENT DOCUMENTS 57-18049 4/1982 Japan .
60-227019 11/1985 Japan .
61-201948 9/1986 Japan .
2153929 8/1985 United Kingdom ............. 192/48.1

Primary Examiner—Rodney H. Bonck
Assistant Examiner—David A. Testardi
Attorney, Agent, or Firm—Armstrong, Nikadio, Marmelstein, Kubovcik & Murray

[57] ABSTRACT

A flywheel assembly comprises a first input flywheel (12); a clutch disk (14) connected to an output shaft (70) and adapted to selectively engage with the first flywheel (12); a second flywheel (26) concentrically and rotatably arranged with respect to the first flywheel (12) and having a predetermined mass; an elastic damper (28) connecting both flywheels together; a first frictional damper mechanism (50) adapted to operate between the second flywheel (26) and the clutch disc (14) only when the clutch disk (14) is engaged with the first flywheel (12); and a second frictional damper mechanism (60) arranged axially between the flywheels and adapted to operate between both flywheels (12, 26) only when the clutch disk (14) is released from the first flywheel (12).

2 Claims, 2 Drawing Sheets

FLYWHEEL ASSEMBLY

FIELD OF THE INVENTION

The present invention relates to a flywheel assembly adapted to aborb or damp vibration in power supplied thereto.

BACKGROUND OF THE INVENTION

A flywheel assembly of this type is disclosed in my commonly assigned Japanese laid open patent publication No. 61-201948(Appin. No. 60-44298) and corresponding U.S. patent application Ser. No. 836,365, now U.S. Pat. No. 4,751,993.

In the disclosed assembly, there is provided, as illustrated in FIG. 3, a first flywheel 101, with which a clutch disk 100 is frictionally engageable, fixed to a crank shaft of an engine, a second flywheel 102 concentrially positioned within the first flywheel 101 and having an appropriate mass, an elastic damper mechanism 103 elastically connecting the flywheels to each other and a first frictional damper mechanism 105, which is operable to connect the second flywheel 102 with a splined hub 104 of the clutch disk 100 when the clutch disk 100 engages with the flywheel 101.

Although this assembly can effectively absorb or damp the vibration in the transmitted power, it has such a disadvantages that the first and second flywheels may resonate when the clutch disk 100 is disengaged.

Accordingly, it is an object of the present invention to provide a flywheel assembly which can effectively absorb the vibration in the transmitted torque and can prevent the resonance of the flywheels when the clutch is disangaged.

DISCLOSURE OF THE INVENTION

In the present invention, a flywheel assembly comprises a first input flywheel; a clutch disk connected to an output shaft and adapted to selectively engage with the first flywheel; a second flywheel concentrically and rotatably arranged with respect to the first flywheel and having a predetermined mass; and elastic damper connecting both flywheels together; a first frictional damper mechanism adapted to operate between the second flywheel and the clutch disk only when the clutch disk is engaged with the first flywheel; and a second frictional damper mechanism adapted to operate between both flywheels only when the clutch disk is released from the first flywheel.

DESCRIPTION OF THE PREFERRED EMBODIMENT

Figure 1:
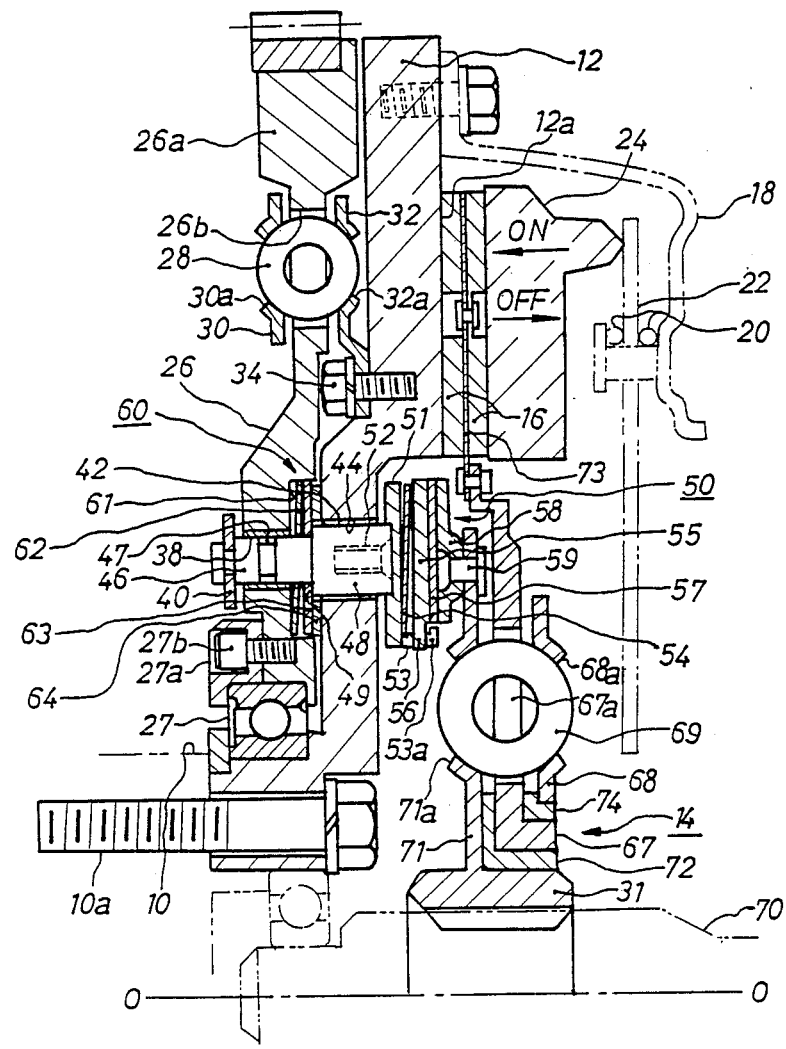
FIG. 1 is a sectional view of an embodiment of the invention.

Referring to FIG. 1, a substantially circular first flywheel 12 is fixed to an end of a crank shaft 10 of an engine by bolts 10a. The flywheel 12 has an annular surface 12a frictionally engageable with a facing 16 of a clutch disk 14. A clutch cover 18 is fixed to the flywheel 12. The clutch cover 12 supports a diaphragm spring 22 for biasing a pressure plate 24 through wire rings 20.

At a side of the flywheel 12 opposite to the facing 16, an annular second flywheel 26 is disposed concentrically and rotatably to the flywheel 12. The second flywheel 26 is integrally provided at a radially outer portion with an annular weight 26a so as to determine a mass of the flywheel 26 appropriately with taking an inertial mass of a drive system in a subsequent transmission (not shown) and others into consideration. A ball bearing 27 is interposed between the flywheels 12 and 26. A bearing support 27a is associated to the bearing 27 and is fixed to the flywheel 26 by bolts 27b.

The flywheel 26 is provided at the radially middle portions with circumferentially spaced openings 26b in which damper springs 28 are fitted for elastically interconnecting the flywheels 12 and 26 with each other. Preferably, four such openings 26b are provided.

A pair of side plates 30 and 32 are disposed at opposite sides of the flywheel 26 and are rigidly connected together by stop pins (not shown). The side plate 32 adjacent to the flywheel 12 is fixed at the radially inner portion to the flywheel 12 by bolts 34. The side plates 30 and 32 are provided with openings 30a and 32a. In which said springs 28 are fitted, respectively. Thus, the flywheel 12 is connected through the side plates 30 and 32 and the springs 28 to the flywheel 26.

Figure 1A:
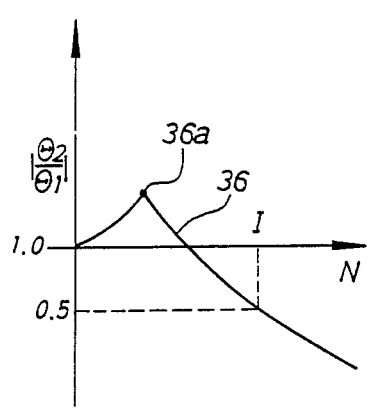
FIG. 1a is a graph of damping characteristics.

The elastic characteristics of the springs 28 and springs 69, which will be detailed later, are determined as follows. In FIG. 1a, $|\theta 2/\theta 1 7$ is an absolute value of a rate between angular accelations of the flywheels 12 ($\theta 1$) and a hub 31 ($\theta 2$) of the clutch disk 14, and N is a rotational speed of the engine. As apparent from a characteristic line 36, FIG. 1a illustrating the relationship between said rate and the speed, an engine speed value corresponding to a resonance point 36a of the flywheels is lower than the idling speed I, and the value $|\theta 2|1$ |decreases in accordance with the increase of the engine speed in an ordinary driving condition. Therefore, the accelation $\theta 2$ of the hub 31 is smaller than a value which may cause the vibration in the transmission.

In FIG. 1, circumferentially spaced pins 42 are axially slidably supported by the radially inner portions of the second flywheel 26 though bushings 38, respectively. Preferably, pins 42 are provided at three locations. An annular end plate 40 is fixed to the end of each pin 42, e.g., by calking, respectively. The pins 42 extend through openings 44 in the flywheel 12 toward the clutch disk 14. Each pin 42 includes a portion 46 of a small diameter provided with a grease groove 47 and fitted in the bushing 38, and a portion 48 of a large diameter fitted in the opening 48 with a stepped portion 49 therebetween.

Circumferential lengths of the openings 44 are so determined that the flywheel 26 may rotate though a predetermined angle relatively to the flywheel 12.

An annular retainer plate 51 of a first frictional damper mechanism 50 is fixed to one of the ends of the pins 42 by bolts 52. The plate 51 is provided at the inner periphery with axial flange 53, around which a first conical spring 54 is fitted. The conical spring 54 elastically contacts an annular first friction plate 55, which has claws 56 unrotatably fitted in recesses 53a in the flange 53. The friction plates 55 is releasably engageable with a friction member 57 (facing), which is fixed, e.g., by adhesive, to an annular bracket 58. The bracket 58 is fixed to a flange 71 of the clutch disk 14 by rivets 59.

A second frictional damper mechanism 60 is arranged between the flywheels 12 and 26 and is accommodated in an annular hollow 61 in the flywheel 26. The mechanism 60 includes a conical spring 62, an annular friction plate 63 and an annular friction member 64 or facing. The pins 42 pass through apertures in the these parts for preventing rotation thereof. The spring 62 is disposed between the flywheel 26 and the friction plate 63. The fiction member 64 is disposed between the flywheel 12 and the plate 63 and is fixed to the plate 63, e.g., by adhesive.

The clutch disk includes the hub 14 as well as center plate 67 and side plate 68 and damper springs 69. The hub 31 is splined to an output shaft 70 which forms the input shaft of the subsequent transmission, and is integrally provided with said radial flange 71. The center plate 67 is disposed between the flange 71 and the side plate 68, and is rotatably fitted around the hub 31 through a bushing 72. The radially outer portions of the plate 67 is connected to cushioning plates or driven plates 73 to which a pair of the facings 16 are fixed with the plates 73 therebetween. The inner periphery of the plate 68 is rotatably fitted to the center plate 67 through a bushing 74, and is rigidly fixed to the flange 71 by axial pins (not shown).

The flange 71 and the plates 67 and 68 are provided with a plurality of (e.g., six sets of) circumferentially spaced openings 71a, 67a, 68a in which damper springs 69 are fitted, respectively, for circumferentially connecting the plate 67 with the flange 71 and the plate 68.

In this structure, when the pressure plate 24 is released in an arrow of 'OFF' to disengage the clutch, the friction member 64 in the second damper mechanism 60 is pressed against friction plate 55 on flywheel 12, and friction plate 55 in the first damper mechanism 50 is released from the friction member 57.

When the clutch disk 14 is forced in a direction of an arrow "ON" by pressure plate 24 to engage the clutch, the friction member 57 is pressed against friction plate 55, and thus, the pins 42 are moved in the same direction, so that the friction plate 63 engaging the stepped portions 49 of the pins 42, which are moved by the disk 14, moves away from the flywheel 12 together with the friction member 64.

Figure 1B:
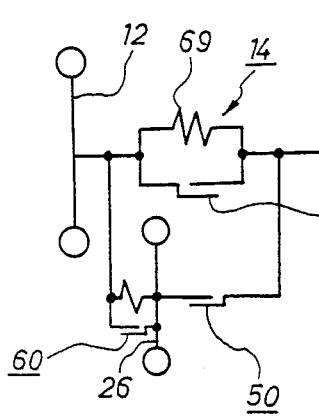
FIG. 1b is a schematic view illustrating a principle of the embodiment in FIG. 1.
Figure 3:
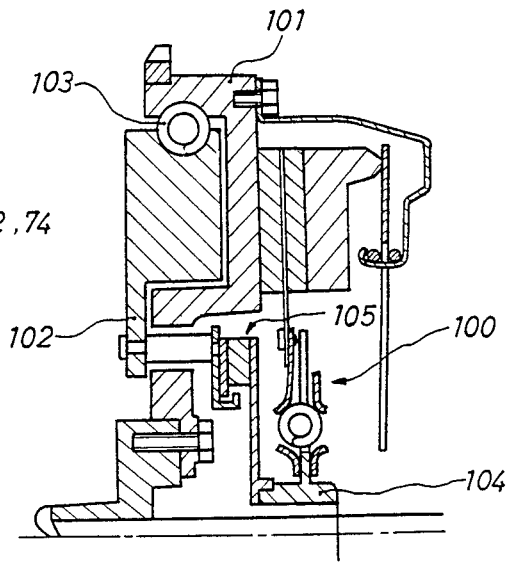
FIG. 3 is a sectional view of an assembly of my Japanese patent application.

The basic principle of the above structures is illustrated in FIG. 1b. In FIG. 1b, the first flywheel 12 is connected to the parallel arranged clutch disk 14 and the second flywheel 26. The clutch disk 14 is provided with damper springs 69 and hysteresis generating means, i.e., the bushings 72 and 74, which are in parallel relationship to each other. The second flywheel 28 is provided with the damper springs as well as the first and second frictional damper mechanism 50 and 60 for generating hysteresis, which are selectively operated.

In FIG. 1, when the clutch is engaged, the facing 16 is pressed onto the surface 12a of the flywheel 12 by the pressure plate 24, and the the clutch disk 14 slides along the shaft 70 to a position in which the friction member 57 is pressed onto the friction plate 55 by a constant elastic force by the spring 54. Therefore, relative vibration between the disk 14 and the flywheel 12 is absorbed by the friction between the plate 55 and the member 57.

Thus, the torque is transmitted from the flywheel 12 though parallel routes, i.e., through the facing 16 and through the flywheel 50 and the damper mechanism 50, to the disk 14, and then, is transmitted to the output shaft 70.

In this engaged condition, the friction member 64 is released from the flywheel 12, as described before. Thus, the torque vibration in the torque to be transmitted to the transmission from the engine is absorbed by the flywheel 26 having the appropriate mass and floated by the springs 28 as well as by the first damper mechanism 50, so that only the effective (actual) torque is transmitted from the flywheel 12 through the disk 14 to the transmission.

In this operation, because the friction member 64 is released from the flywheel 12, as described before, the damper mechanism 60 does not affect the vibration absorbing effect by the flywheel 26. The flywheel assembly can effectively perform the predetermined function.

When the clutch is released, the facing 16 is released from the flywheel 12 and the friction plate 55 of the damper mechanism 50 is released from the friction member 57. Thus, the torque is not transmitted to the clutch disk 14. In this condition, because the disk 14 does not force the pins 42, the friction member 64 on the plate 63 is pressed onto the flywheel 12 by the spring 62.

Therefore, both flywheels 12 and 26 are frictionally engaged by the frictional damper mechanism 60, so that the resonance thereof is prevented.

ADVANTAGES OF THE INVENTION

According to the invention, as described hereinabove, the resonance of the flywheel 26 can be effectively prevented by the frictional damper mechanism 60 interposed between the flywheels 12 and 26 when the clutch is released.

Figure 2:
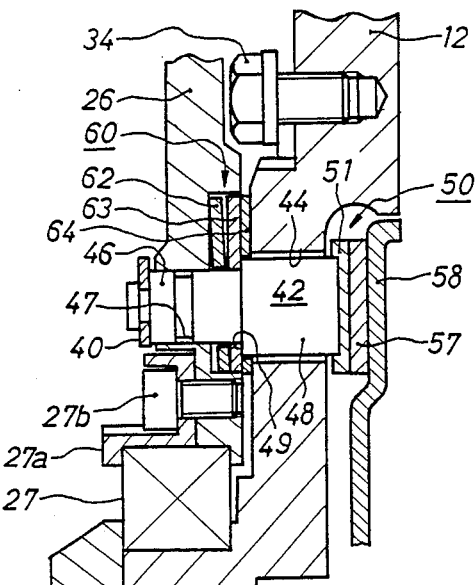
FIG. 2 is a partial sectional view of another embodiment.

The present invention is not restricted to the embodiment in FIG. 1. For example, the conical spring 54 in the damper mechanism 50 in FIG. 1 may be eliminated, as shown in FIG. 2. The friction member 57 to which the friction plate 55 engages may be directly fixed to the hub or flange of the clutch disk.

INDUSTRIAL APPLICABILITY

As described above, the present invention can be advantageously adapted to friction clutches for automobiles, and particularly, to structures, in which resonance of the flywheels are desired to be effectively prevented.

What is claimed is:

1. A flywheel assembly comprising a first input flywheel; a clutch disk connected to an output shaft for selective engagement with the first flywheel; a second flywheel concentrically and rotatably arranged with respect to the first flywheel and having a predetermined mass; and elastic damper connecting the first and second flywheels with each other; a first friction damper mechanism engagable to frictional couple said second flywheel and said clutch disk when said clutch disk is engaged with said first flywheel; and a second frictional damper mechanism axially between said first and second flywheels and engagable to frictionally couple said first and second flywheels when said clutch disk is released from said first flywheel, means for engaging said first frictional damper mechanism when said clutch disk is engaged with said first flywheel and for disengaging said first frictional damper mechanism when said clutch disk and said first flywheel are disengaged and means for engaging said second frictional damper mechanism when said clutch disk is disengaged from said first flywheel and for disengaging said second frictional damper mechanism in response to engagement of said clutch disk with said first flywheel.

2. A flywheel assembly of claim 1 wherein an axial pin is axially slidable held by said second flywheel and passes through a circumferentially long opening in said first flywheel, said first frictional damper mechanism is interposed between said pin and said clutch disk, and said second frictional damper mechanism is interposed on said pin between said first and second flywheels.

* * * * *